United States Patent [19]
Norman
[11] 3,798,544
[45] Mar. 19, 1974

[54] MULTILEVEL PCM SYSTEM ENABLING AGC CONTROL OF A TRANSMITTED MULTILEVEL SIGNAL IN ANY SELECTED FREQUENCY PORTION OF SAID TRANSMITTED SIGNAL

[75] Inventor: Peter Norman, Dartford, England
[73] Assignee: International Standard Electric Corporation, New York, N.Y.

[22] Filed: Aug. 23, 1972
[21] Appl. No.: 283,148

[30] Foreign Application Priority Data
Sept. 23, 1971 Great Britain .................... 44389/71

[52] U.S. Cl. .................... 325/38 A, 325/13, 325/64, 325/141, 325/326
[51] Int. Cl. .................... H04b 1/00
[58] Field of Search .................... 178/DIG. 3, 5.1; 179/15 AV, 15 BW, 15 AC; 325/13, 15, 32, 62, 64, 141, 326; 333/17, 18, 28; 340/146.1 A, 146.1 AL

[56] References Cited

UNITED STATES PATENTS 3,649,915 3/1972 Mildonian .................... 325/38 A
3,679,821 7/1972 Schroeder .................... 178/DIG. 3
2,759,047 8/1956 Meacham .................... 325/38 A
3,414,687 12/1968 Hermes et al. .................... 325/62

*Primary Examiner*—Albert J. Mayer
*Attorney, Agent, or Firm*—John T. O'Halloran; Menotti J. Lombardi, Jr.; Alfred C. Hill

[57] ABSTRACT

This relates to a PCM system having a substantially constant power amplitude distributed throughout the frequency spectrum of a digital signal. This enables selecting a suitable portion of the spectrum of the digital signal for operation of the AGC circuits of the system, particularly those AGC circuits contained in predetermined ones of repeater incorporated in the system. To accomplish this, the system includes, in the transmitter, a pseudo-random scrambler operating on a binary signal input to provide the substantially constant power amplitude distributed throughout the frequency spectrum of the input binary signal. The output signal of the scrambler is converted to a ternary signal prior to transmission. At the receiver the ternary input signal is converted to a binary signal. The binary signal at the output of the last converter is descrambled to compensate for the scrambling of the scrambler and to produce a replica of the binary input to the system.

4 Claims, 3 Drawing Figures

MULTILEVEL PCM SYSTEM ENABLING AGC CONTROL OF A TRANSMITTED MULTILEVEL SIGNAL IN ANY SELECTED FREQUENCY PORTION OF SAID TRANSMITTED SIGNAL

BACKGROUND OF THE INVENTION

This invention relates to multilevel pulse code modulation (PCM) systems.

Normal PCM systems recognize the presence of a pulse as a change of signal amplitude from one level to another; one of the levels usually being zero, and the significance of the pulses is recognized by their time relation to a synchronizing signal. In multilevel PCM systems, the signal level is used to indicate the significance of pulses in addition to the significance indicated by their position with reference to the synchronizing signal. The most usual form of multilevel system is a ternary system in which the pulses are of opposite polarity.

Since the level of the transmitted signal has significance, the circuits, particularly the amplifier circuits, in multilevel systems have automatic gain control (AGC) to compensate for variations, such as those due to temperature and ageing, and often this gain control is used to change the gain of the circuit at different frequencies, i.e., it controls the gain-frequency characteristic of the circuit as well as the absolute level of the gain.

If in PCM systems the characteristics of the system are controlled by detecting the peaks of the received signal, the control is unsatisfactory when the bandwidth of the transmission path is not infinite and/or when its phase-frequency characteristic is not linear. In such systems, the number of pulses occurring in a given interval is a function of the intelligence being transmitted. As a result of the characteristics of the transmission path, when adjacent time slots are occupied by a group of pulses of the same polarity the group is received as a single pulse having an amplitude greater than the pulse that is received when a single pulse of that polarity is transmitted. These high amplitude pulses actuate the AGC control. Since these longer pulse shapes are a function of the lower frequencies in the signal, the AGC control is also relatively insensitive to changes in the transmission characteristics at the high frequency end which is most affected by temperature and ageing and which it is most important to correct.

SUMMARY OF THE INVENTION

An object of the present invention is to provide a multilevel PCM system capable of AGC control throughout the frequency spectrum of a multilevel signal.

A feature of the present invention is the provision of a multilevel pulse code modulation transmission system comprising: a transmitter including a system input for binary signals, and first means coupled to the input to produce from the binary signals scrambled multilevel signals having a substantially constant power amplitude distributed throughout the frequency spectrum thereof; and a receiver including a second means coupled to the first means to receive the scrambled multilevel signals and to produce from the received scrambled multilevel signals a replica of the binary signals at the system input.

Another feature of the present invention is the provision of a transmitter for a multilevel pulse code modulation system comprising: a system input for binary signals; and a circuit arrangement coupled to the input to produce from the binary signals scrambled multilevel signals having a substantially constant power amplitude distributed throughout the frequency spectrum thereof.

Still another feature of the present invention is the provision of a receiver for a multilevel pulse code modulation system comprising: a receiver input for scrambled multilevel signals having a substantially constant power amplitude distributed throughout the frequency spectrum thereof, the scrambled multilevel signals being produced from binary signals applied to an input of the system; and a circuit arrangement coupled to the receiver input to produce from the scrambled multilevel signals a replica of the binary signals applied to an input of the system.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENT

Figure 1:
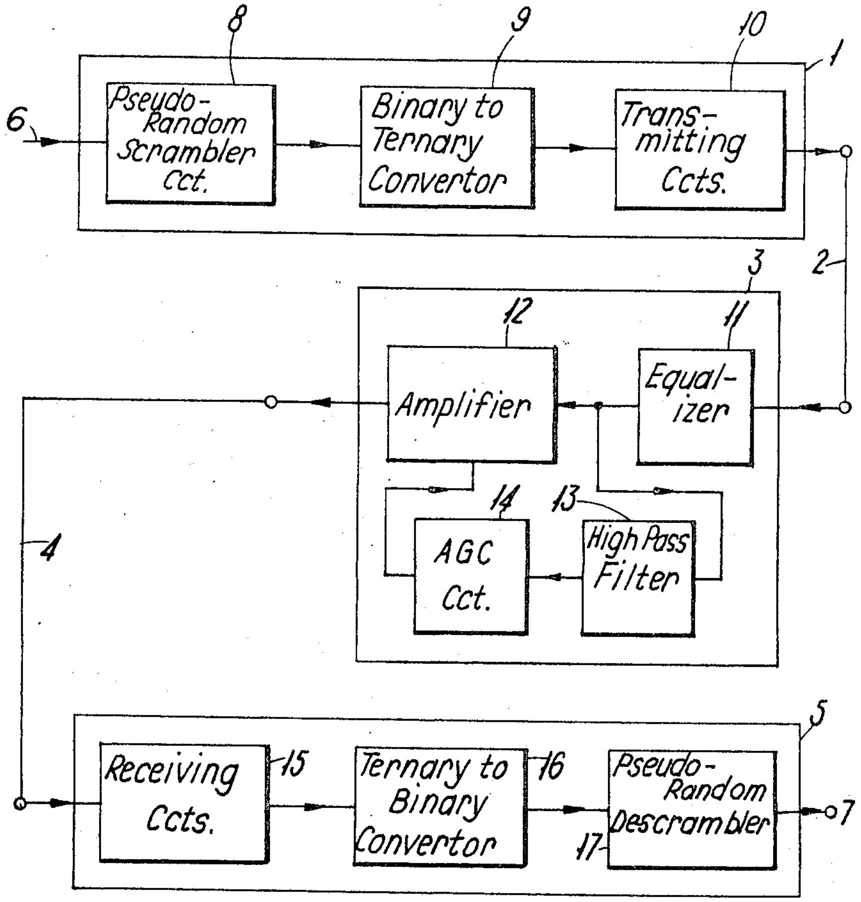
FIG. 1 is the block circuit diagram of a multilevel PCM system in accordance with the principles of the present invention.

Referring to FIG. 1, the drawing illustrates the circuits and their interconnection for a multilevel PCM system in accordance with the principles of the present invention. The transmitter 1 is connected via a transmission path 2, 4 to a receiver 5, the transmission path including a single repeater 3. Transmission path 2, 4 in this embodiment is a coaxial cable, but the invention is applicable to systems operating on any transmission path. Only one direction of transmission is shown, the opposite direction of transmission being identical. The system is shown as only including one repeater for simplicity, but usually a system will include a number of repeaters not all of which include an AGC circuit. The signal applied to the system input 6 and the replica thereof produced at the system output 7 are binary signals. Methods of producing a binary signal from any form of intelligence, or from an analog signal source or sources, and means for synchronizing and multiplexing multichannel signals are all well known and are not considered further herein. Such operations are preferably performed before input 6 and after output 7 of the multilevel PCM system.

At transmitter 1 the binary input signal of the multilevel system is applied via input 6 to a scrambler circuit 8. Scrambler circuit 8 scrambles the binary signal at input 6 and provides a scrambled binary signal output having a substantially constant power amplitude distributed throughout the frequency spectrum thereof. The output of the scrambler circuit is applied to the binary-to-ternary converter 9 which in this embodiment converts four binary digits representing sixteen different conditions to three ternary digits which are capable of representing twenty seven different conditions. The output of circuit 9 is a scrambled ternary pulse signal which is applied to transmission path 2 via the transmitting output circuit 10.

At repeater 3 the input signal received from transmission path 2 is applied to an equalizer 11 which largely compensates the gain-frequency characteristic of transmission path 2. The output of equalizer 11 is connected both to the input of amplifier 11 and the input of a high pass filter 13 which passes the upper 25 percent of the transmission frequency band or frequency spectrum of the scrambled ternary signal. The output of filter 13 is applied to the AGC circuit 14 which produces at its output a control signal the amplitude of which is a function of the power of the signals appearing in the upper 25 percent of the transmission frequency band or frequency spectrum of the scrambled ternary signal. This control signal is applied to the control signal input of amplifier 12. Amplifier 12 is a multistage amplifier having an overall feedback path including a frequency dependent circuit which includes an active element to which the AGC control signal is applied. The AGC control signal and the active element controls the frequency characteristic and the loss of feedback path to control the gain and gain-frequency characteristic of amplifier 12. The output of amplifier 12, which is the output of repeater 3, is connected to one end of transmission path 4 the other end of which is connected to the input of the receiving circuit 15 in receiver 5.

At receiver 5 the input is connected via a binary-to-ternary convertor 16 to the input of a descrambler circuit 17 the output which is connected to the system output terminal 7. Descrambler circuit 17 produces a binary signal which is a replica of the input binary signal at terminal 6.

Suitable circuits for those indicated in block form as the transmitting output circuit 10 and the receiving output circuit 15 are well known as are all the circuits 11 to 14 and interconnection thereof in repeater 3. Suitable circuits for the binary-to-ternary convertor 9 and the ternary-to-binary convertor 17 have been described in British Pat. No. 1,156,279.

Figure 2:
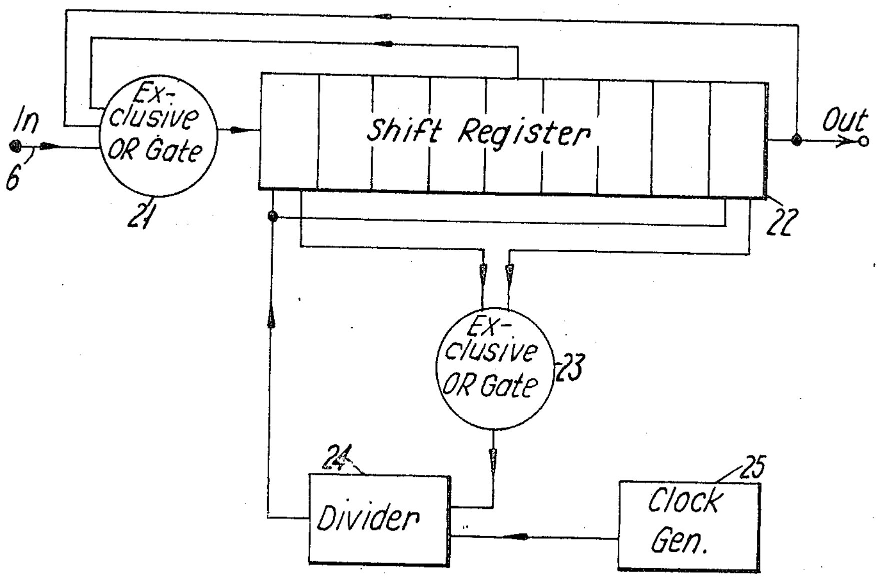
FIG. 2 is a block diagram of one embodiment of the scrambler circuit of FIG. 1.

A circuit suitable for use as scrambler 8 is shown in FIG. 2 and consists of a shift register having feedback links applied to give a maximal-length feedback shift register. A register of this type comprising n stages will produce a continuous train of pulses. The train of pulses comprising groups of $2^n$-1 pulses. In the embodiment illustrated $n$ equals nine.

Feedback paths from the fifth and ninth stages and the binary input are fed via an EXCLUSIVE OR gate 21 to the input of a 9 bit shift register 22. This stream of pulses moves down the shift register until it appears at the feedback paths where it is fed back to gate 21. This results in the incoming binary sequence being added to a pseudo-random sequence of pulses produced by the shift register and thereby producing the pseudo-random output of the scrambler. In addition to the above two feed-back loops, EXCLUSIVE OR gate 23 is fed from two stages of the shift register which are eight bits apart. The output of gate 23 is fed to a divider circuit 24 clocked by the signal from clock signal generator 25. The output of divider 24 is connected both to the reset input of the first stage and the set input of the last stage. In this embodiment, divider 24 divides by three and the clock signal generator is a multivibrator producing clock signals every 0.5 ms (milliseconds). The function of this is to detect patterns of $2^8$-1 bits being constantly recycled thereby reducing the number of pulses occurring before a pulse pattern is repeated. If one such pattern is detected and persists after a lapse of time (1.5 seconds) two stages of shift register 22 eight bits apart feeding gate 23 are, respectively, SET and RESET. This clears the recycled patterns with some number of errors, which is insignificant.

Figure 3:
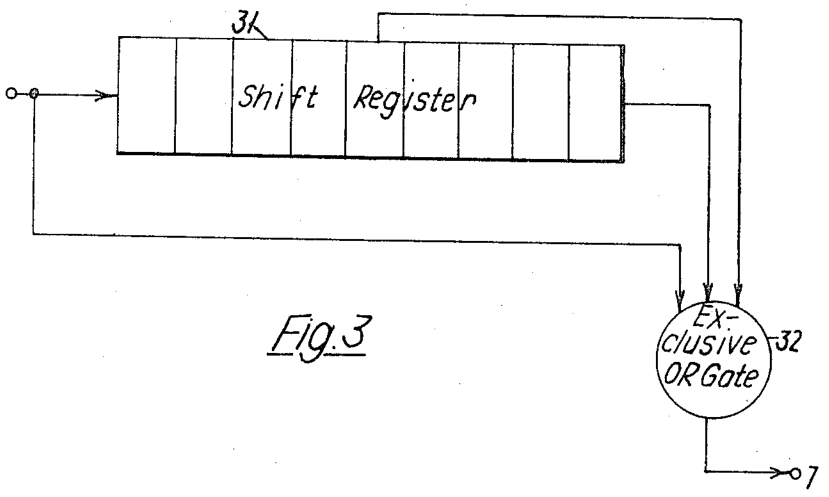
FIG. 3 is a block circuit diagram of one embodiment of the descrambler circuit of FIG. 1.

A circuit suitable for use as descrambler 17 is shown in FIG. 3 and consists of a shift register 31 have the same length of bits as the scrambler, i.e., nine, and also having two feedback loops. However, these feedback loops differ from those of the scrambler shift register, since they feed forward as opposed to backwards in the scrambler.

Feedback paths from the fifth and ninth stages are EXCLUSIVE OR'D with the scrambled incoming binary signal in EXCLUSIVE OR gate 32. The output of Gate 32 is a descrambled binary output.

The shift registers in the scrambler and descrambler, respectively, are self synchronizing, since the output from the one is the input to the other.

The part of the frequency band selected at repeater 3, in this case, by filter 13 will depend chiefly on the characteristic of the transmission path used. When the transmission path is coaxial cable, its frequency and loss characteristics are subject to greater variation at the high frequency end of the transmission band than at the lower end. The equalizer disposed at each repeater is adjustable to equalize approximately the length of cable between the repeater and the proceeding circuit. Where the system includes a number of repeaters, selected repeaters may include mop-up equalizers to reduce the cumulative error of this equalization. The equalization, however, is static, but the frequency characteristic of the cable varies with age and temperature so that the AGC circuit is normally installed to adjust the amplified characteristic of amplifier 12 to compensate for this variation and to deal with the residue error of the mop-up equalizer.

In the particular case of a coaxial cable transmission system, the filter will usually be chosen to select only the upper end of the transmission frequency band because this part of the band is the most significant for the pulse horizon and also in this part of the band thermal noise has the most significant effect. When other transmission paths are used other parts of the band or one or more parts of the band may be chosen to correct the characteristics of the overall transmission path.

The method of selecting the frequency band is not limited to the use of filters. Any suitable circuit may be used. For instance, to select the upper part of the frequency band the signal may be differentiated, while to select other parts of the band the signal may be chopped and then integrated.

The invention is not limited to systems in which the information is transmitted over the transmission path in one direction only. The information may be applied to a transmission systems in which both directions of transmission occur on the same transmission path.

The two functions of the system which are controlled are the gain characteristic, which governs the total power of the signal at that point in the system being considered, and the gain-frequency characteristics, which governs the shape of the pulse signal at that point in the system being considered.

While I have described above the principles of my invention in connection with specific apparatus it is to be clearly understood that this description is made only by way of example and not as a limitation to the scope of my invention as set forth in the objects thereof and in the accompanying claims.

I claim:

1. A multilevel pulse code modulation transmission system comprising:
a transmitter including
a system input for binary signals,
a scrambler coupled to said system input to provide scrambled binary signals having a substantially constant power amplitude distributed throughout the frequency spectrum thereof, and
a binary-to-ternary converter coupled to said scrambler to convert said scrambled binary signals to scrambled ternary signals having said substantially constant power amplitude distributed throughout the frequency spectrum thereof;
at least one repeater including
a first means coupled to said binary-to-ternary converter to select a predetermined frequency portion of said frequency spectrum of said scrambled ternary signals and to produce a control signal from said predetermined frequency portion, and
second means coupled to said binary-to-ternary converter and to said first means, said second means being responsive to said control signal to control the gain and/or gain-frequency characteristic thereof; and
a receiver including
a ternary-to-binary converter coupled to said second means to receive said scrambled ternary signals and convert said received scrambled ternary signals to said scrambled binary signals, and
a descrambler coupled to said ternary-to-binary converter to produce from said scrambled binary signals at the output of said descrambler a replica of said binary signals at said system input.

2. A system according to claim 1, wherein
said scrambler includes
a pseudo-random scrambler.

3. A system according to claim 1, wherein
said descrambler includes
a pseudo-random descrambler.

4. A system according to claim 1, wherein
said first means includes
a filter coupled to said binary-to-ternary converter, and
an automatic gain control circuit coupled to said filter to produce said control signal; and
said second means includes
an amplifier coupled to said binary-to-ternary converter and said automatic gain control circuit.

* * * * *